March 13, 1962 N. D. DAUGUSTA 3,024,686
TOOL POSTS
Filed Aug. 12, 1955 3 Sheets-Sheet 1

INVENTOR.
NATHAN D. DAUGUSTA
BY George B White
ATTY.

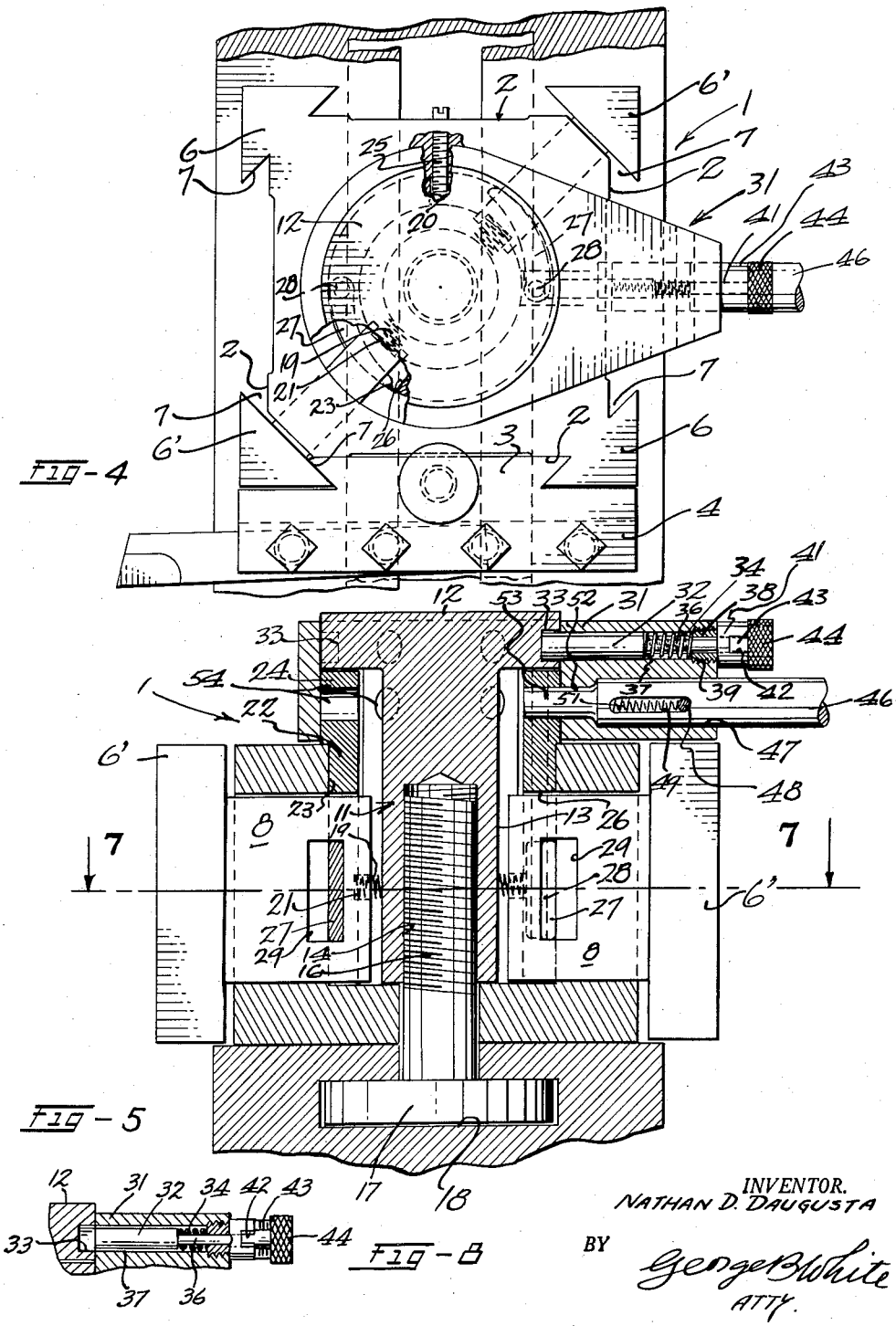

March 13, 1962 N. D. DAUGUSTA 3,024,686
TOOL POSTS

Filed Aug. 12, 1955 3 Sheets-Sheet 3

INVENTOR.
NATHAN D. DAUGUSTA
BY George B. White
ATTY.

United States Patent Office 3,024,686
Patented Mar. 13, 1962

3,024,686
TOOL POSTS
Nathan D. Daugusta, 48 Santa Yzabel Ave.,
San Francisco, Calif.
Filed Aug. 12, 1955, Ser. No. 527,900
3 Claims. (Cl. 82—36)

This invention relates to a tool post and particularly to means for gripping or releasing tool holders in the tool post.

The general character of this tool post and tool holder is the same as described in my copending application, Serial No. 219,234, filing date, April 4, 1951, on Tool Post and Tool Holder, of which this application is a continuation in part.

The primary difference between my aforesaid copending application and the herein invention is the manner whereby quick yet balanced gripping of the tool holders is accomplished by corner jaws pulled in by suitable cam or wedge actuator whereby the tool holders can be quickly gripped or released yet be held in substantially equalized position.

The primary object of the invention is to provide a tool post of generally rectangular shape with a dovetail recess on each side or face thereof so as to form diagonally opposite fixed corner jaws and on the intermediate diagonally opposite corners movable jaws, at the respective ends of the respective dovetail recesses, so that as the dovetail of a holder is inserted in a recess then the holder may be gripped by pulling the movable jaws inwardly so as to jam the dovetail of the holder firmly into the respective corners of the dovetail recess; means being provided in coordination with the central portion of the post for quick releasing or applying of the movable corner jaws.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 4 is a plan view of my tool post with tool holder in position.

FIG. 5 is a general cross-sectional view of my tool post, the section being taken generally through the movable corner jaws, the portions of the actuating wrench being also shown in section.

FIG. 8 is a fragmental sectional view of the wrench engaging structure showing the plunger withdrawn from the socket of the nuthead.

Figure 1:
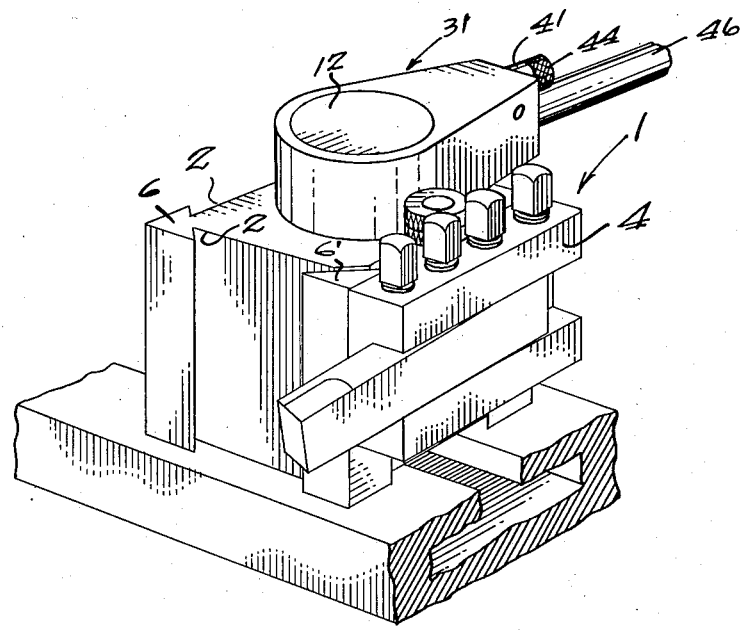
FIG. 1 is a perspective view of a tool post and holder constructed in accordance with my invention.
Figures 2, 3:
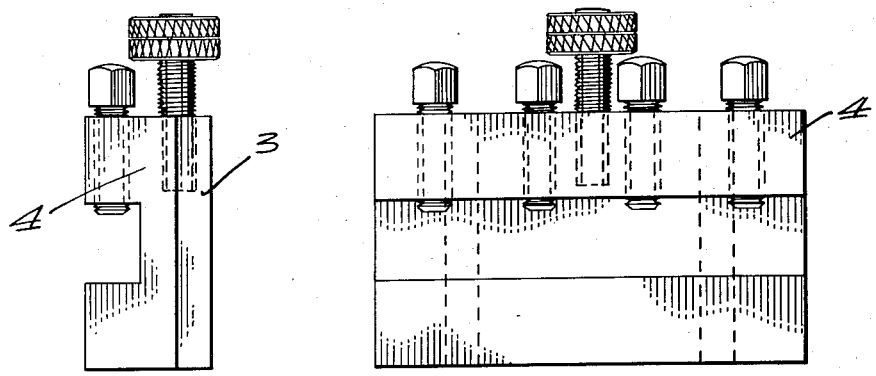
FIG. 2 is a side view of the tool holder to be inserted in my tool.
FIG. 3 is a face view of my tool holder for this tool assembly.

My tool post 1 is generally rectangular and has on each face thereof a vertical dovetail recess 2 for slidably receiving the dovetail 3 of a tool holder 4.

The formation of the dovetail recesses 2 on the faces of the tool post forms corner bosses or jaws 6 of generally triangular cross section so that opposite inner corners of the jaws 6 form the respective vertical ends 7 of the dovetail recesses 2. A pair of diagonally opposite jaws 6 are stationary. The other two diagonally opposite jaws 6' are movable diagonally with respect of the tool post 1. Thus after the tool holder dovetail 3 is slid into the respective dovetail recess 2, it can be rigidly fixed therein by pulling the movable jaws 6' inwardly of the tool post and against the respective adjacent edges of the holder dovetail 3. This action not only grips the edge of the dovetail 3 adjacent to the movable jaw 6' but also pushes the other edge of the dovetail 3 in the inner corner of the opposite fixed jaw 6 by reason of the component of forces exerted generally parallel with the face of the recess.

The manipulating or operating mechanism for the releasing or gripping of the tool holder includes a leg 8 extended from the base of each triangular movable jaw 6'. The leg 8 slidably extends into and through a corresponding aperture 9 diagonally from the corner toward the center of the tool post 1. Each leg 8 is of substantial height. In the present illustration the height of the leg 8 is equal to or more than half of the height of a movable jaw 6'. This facilitates the maintaining of the movable gripping jaws 6' in true position without wobbling vertically or laterally.

The tool post has a central clamping nut device 11 extending from the top to the bottom. The head 12 of the nut device 11 is above the top of the tool post 1. The stem 13 of the nut device 11 extends downwardly into the center of the tool post 1 and has therein a threaded hole 14 which fits over a bolt 16. The head 17 of the bolt 16 is in the T slot 18 of the usual lathe or machine tool.

A coil spring 19 located in a suitable spring socket 21 in the inner end of the jaw leg 8, bears against the outer cylindrical periphery of the nut stem 13 so as to slide on the nut stem as the latter is rotated for clamping the post in position. The function of the springs 19 is to push the respective jaw legs 8 and the movable jaws 6' diagonally outwardly of the tool post into releasing position.

Figure 6:
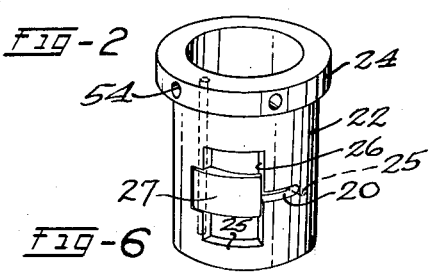
FIG. 6 is a perspective detail view of a modified form of the wedge actuating cylinder of my tool holder.
Figure 7:
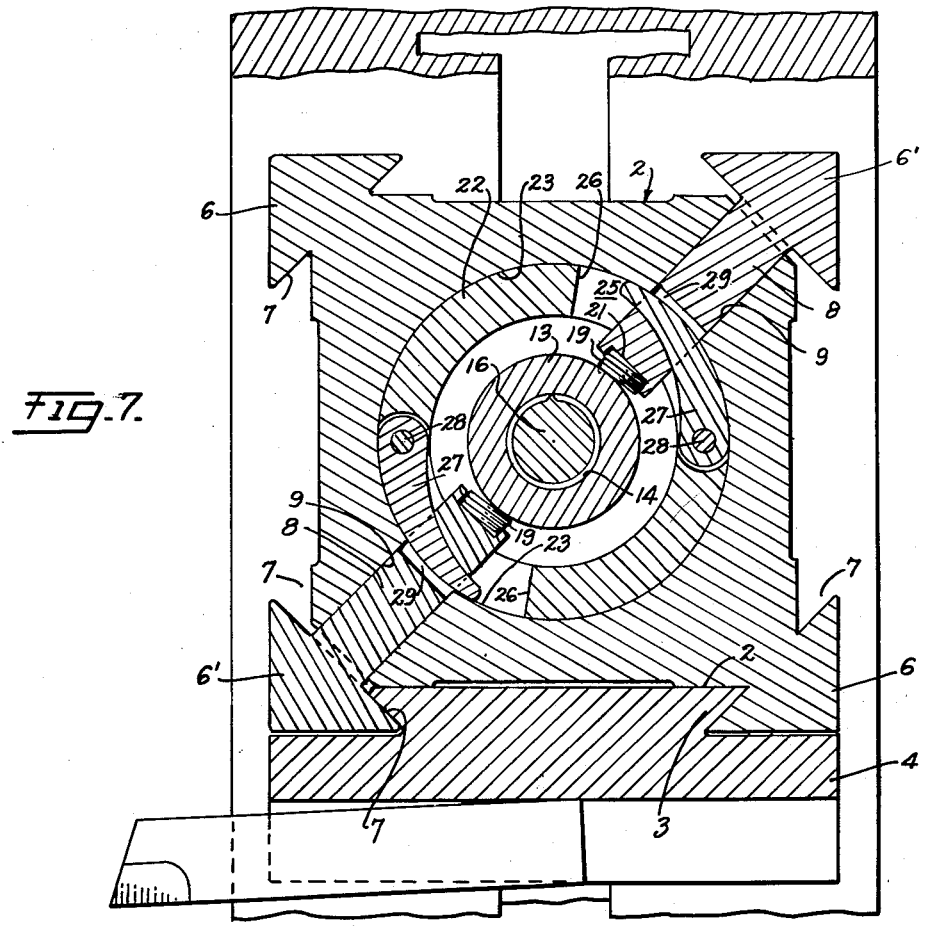
FIG. 7 is a cross sectional view on a larger scale than FIG. 4, taken generally on lines 7—7 of FIG. 5.

For the tightening of the movable gripping jaws 6' I provide a rotating cylinder 22 journalled in a circular hole 23 in the center of the tool post 1 surrounding the nut stem 13. The cylinder 22 has thereon a head 24 above the top surface of the post 1. The cylinder 22 also has a pair of diametrically opposite slots 26 straddling the respective jaw legs 8 so as to permit the rotation of the cylinder 22 relatively to said legs 8. As shown in FIG. 6 the slots 26 may be bridged at the bottom by a connecting wall 25.

In each slot 26 is pivoted a wedge 27. A pivot pin 28 extends through the wider end of the wedge 27 and is mounted in the adjacent wall of the cylinder 22 so as to form the vertical pivot. Each wedge 27 extends into an adjacent cam slot 29. The wedges 27 taper in the same direction circumferentially with respect to said cylinder 22 so that when the cylinder 22 is rotated in contra clockwise direction viewing FIG. 4, the wedges 27 exert a camming action on the respective cam slots 29. The inner wall of the cam slot 29 is transversely curved generally to conform to the adjacent curved side of the wedge 27 therein and so as to hold the tip of the wedge 29 against the inner cylindrical wall 23 of the post 1. Thus the wedges 29 bear against the inner wall 23 of the post 1 so as to exert inward pulling force on the cam slots 29. Thus as the wider portions of the wedges are introduced, the respective jaw legs 8 are pulled inwardly against the action of the coil springs 19 for tightening the movable jaw 6'. When the cylinder 22 is rotated in clockwise direction viewing FIG. 4, then the wedges 27 are withdrawn from the slots 29 and allow the coil springs 19 to push the legs 8 outwardly into the releasing position shown in FIG. 5. A narrower horizontal slot 20 in the cylinder 22 opens into one of the vertical slots 26 and rides on a limit screw 25 so that the free end or tip of the adjacent wedge abuts the limit pin after a predetermined travel.

For quick securing of the tool post in position and also for the quick locking of the tool holder on the tool posts any suitable mechanism may be provided, for instance, the double action wrench heads as illustrated in my said copending application. In this wrench head 31 is a plunger 32 adapted to enter into one of a series of holes 33 provided in the periphery of the nut head 12. A coil spring 34 surrounds a reduced portion 36 of the plunger 32 and bears against a shoulder 37 so as to urge this plunger 32 inwardly of the head. The outer end of the coil spring 34 bears against a plug 38 in the end of the hole 39. In the head 41 of the plug 38 is a transverse slot 42 into which fits a transverse neck 43 on the outer end of the plunger 32. As the plunger 32 is withdrawn from the socket 33 in order to free the wrench head from the nut, the knob 44 is turned with the plunger 32 so that the transverse neck 43 is turned out of alignment with the transverse slot 42 and bears against the outer end of the plug head 41 and thus holds the plunger 32 out of the socket 33 of the nut 11.

A handle 46 is slidable in a socket 47 in the wrench head 31 below the plunger 32. A transverse pin 48 in the socket 47 extends through a longitudinal slot 49 in the handle 46. A coil spring 51 presses against the pin 48 and against the other end of the elongated slot 49 so as to urge the handle 46 inwardly of the socket 47. Through a reduced hole 52 in the inner end of the socket 47 extends a reduced end 53 of the handle 46 fitting into one of the series of holes 54 in the periphery of the cylinder head 24.

In operation the tool post is mounted in position by releasing the plunger 32 and pulling out the handle 46 so as to allow the turning of the wrench head independently of the cylinder 22. As the plunger 32 enters into one of the sockets 33, and the handle 46 is pulled out of engagement with the cylinder 22, the nut 11 can be quickly turned either to secure the post in position or to release it.

Then the tool holder is clamped in position, by sliding it under a pair of jaws 6 and 6 at the respective face of the tool as heretofore described, then the knob 44 and the plunger 32 are pulled out and turned so as to hold the plunger 32 out of the sockets 33 of the nut 11, and the handle 46 is allowed to enter into one of the holes 54 of the cylinder head 24 so as to turn the cylinder 22 in counter-clockwise direction viewing FIG. 4 thereby exerting camming action by the wedges 27 so as to pull the jaw legs 8 inwardly and thus quickly and firmly drawing the movable jaws 6' into clamping position in the manner heretofore described. It is to be noted the central portions of the respective faces of the post are relieved so as to reduce friction and facilitate accurate clamping of the holders in position.

I claim:

1. In combination with a tool post and a tool holder, slidable therein, said tool holder having a dovetail thereon to fit over a face of said tool post; a dovetail recess on each outer face of said tool post, generally triangular jaws formed at the corners of said post by the ends of the respective dovetail recesses, one set of diagonally opposite pair of jaws being fixed, the other diagonally opposite pair of jaws being movable generally diagonally with respect to said post for gripping and releasing the dovetail of the holder in said dovetail recess, a leg extended from each movable jaw generally inwardly of said post, resilient means to normally urge the said legs and said movable jaws outwardly with respect to said tool post, wedge means coacting with said legs for pulling the legs inwardly, and a manipulating device for operating said wedge means.

2. In combination with a tool post and a tool holder, said tool post having a dovetail recess on the face thereof and said tool holder having a dovetail fitting into said dovetail recess, a fixed jaw at the corner of said tool post formed by one vertical edge of said dovetail recess, a movable jaw formed by the other edge of said dovetail recess, each of said jaws having surfaces adapted to engage the respective corners of the dovetail of the holder, a leg of said movable jaw being slidably held in said post and having an aperture therethrough, a cylindrical element rotatably held in said post and straddling said leg so as to be movable relatively to said leg, an arcuate wedge pivotably held on said cylindrical element and engaging said aperture and bearing against the inner periphery of said post so as to pull said leg and said movable jaw inwardly of the post when said element is turned in one direction and to release said leg and jaw when said element is turned in the opposite direction respectively to cause said jaws to grip and release the dovetail of said holder.

3. A clamping device for a tool post comprising a tool holder wedge clamping cylinder rotatable in said tool post, a post clamping nut rotatable in said cylinder for clamping the post on a bolt, the top of said nut extending above the top of the cylinder, a hollow handle-hub fitting around the top of said nut and the top of said cylinder, a series of spaced holes in the periphery of each top, a pair of spaced generally vertically aligned spring-loaded plungers in said hub each normally urged to the adjacent top for engagement with a registering hole, coacting releasable plunger arresting elements on said hub and on one of said plungers for holding said plunger out of engagement with the adjacent head, the other plunger being extended outwardly to form a handle for turning said hub and the respective engaged heads.

References Cited in the file of this patent

UNITED STATES PATENTS

| | | |
|---|---|---|
| 2,187,854 | Hallenbeck et al. | Jan. 23, 1940 |
| 2,403,405 | Sirola | July 2, 1946 |
| 2,453,722 | Moss | Nov. 16, 1948 |
| 2,466,199 | Berthiez | Apr. 5, 1949 |
| 2,466,596 | Krause | Apr. 5, 1949 |
| 2,505,684 | McClernon | Apr. 25, 1950 |
| 2,730,918 | Daugusta | Jan. 17, 1956 |

FOREIGN PATENTS

| | | |
|---|---|---|
| 54,231 | France | June 5, 1948 |
| 56,240 | France | Sept. 19, 1952 |
| 407,267 | Italy | Sept. 26, 1944 |
| 490,995 | Italy | Feb. 22, 1954 |
| 893,943 | France | Nov. 14, 1944 |
| 912,119 | France | July 31, 1946 |
| 973,098 | France | Feb. 7, 1951 |
| 1,051,596 | France | Jan. 18, 1954 |
| 1,091,194 | France | Oct. 27, 1954 |